United States Patent
Hu

(10) Patent No.: US 10,359,568 B2
(45) Date of Patent: Jul. 23, 2019

(54) MICRO-RING RESONATOR

(71) Applicant: Huawei Technologies Co., Ltd., Shenzhen (CN)

(72) Inventor: Jing Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 2 days.

(21) Appl. No.: 15/618,356

(22) Filed: Jun. 9, 2017

(65) Prior Publication Data

US 2017/0276873 A1 Sep. 28, 2017

Related U.S. Application Data

(63) Continuation of application No. PCT/CN2014/093612, filed on Dec. 11, 2014.

(51) Int. Cl.
*G02B 6/00* (2006.01)
*G02B 6/125* (2006.01)
(Continued)

(52) U.S. Cl.
CPC ............ *G02B 6/125* (2013.01); *G02B 6/126* (2013.01); *G02B 6/27* (2013.01); *G02B 6/2773* (2013.01);
(Continued)

(58) Field of Classification Search
CPC ...... G02B 6/126; G02B 6/105; G02B 6/2766; G02B 6/2726; G02B 6/2773; G02B 6/00
See application file for complete search history.

(56) References Cited

U.S. PATENT DOCUMENTS 8,452,185 B2   5/2013  Little et al.
9,046,704 B2 *  6/2015  Costache .............. G02F 1/313
(Continued)

FOREIGN PATENT DOCUMENTS

CN  101726801 A  6/2010
CN  101840028 A  9/2010
(Continued)

OTHER PUBLICATIONS

Qiang Xu et al., "Voltage controlled polarization rotation from Berry's phase in silicon optical microring resonators", 2014 conference on lasers and electro-optics (CLEO)—laser science to photonic applications, the optical society, Jun. 8, 2014, 2 pages, XP032708295.
(Continued)

*Primary Examiner* — Jennifer Doan

(57) ABSTRACT

A micro-ring resonator includes at least one first straight waveguide; a second waveguide (Arm3) and a third waveguide (Arm2), where the second waveguide (Arm3) and the third waveguide (Arm2) form a closed annular waveguide, and the annular waveguide is coupled to the first waveguide; a fourth waveguide (Arm1), where the fourth waveguide (Arm1) is coupled to the annular waveguide; and a polarization splitter (PS), where one end of the polarization splitter (PS) is connected to the fourth waveguide (Arm1), and one end is connected to the second waveguide (Arm3) in the annular waveguide. In the micro-ring resonator, a distance between two waveguides for separately transmitting different polarized light breaks a limitation of a resonator radius, and further, a distance between a TE path and a TM path is reduced.

15 Claims, 9 Drawing Sheets

(51) Int. Cl.
*G02B 6/27* (2006.01)
*G02B 6/126* (2006.01)
*G02B 6/293* (2006.01)
*G02B 6/12* (2006.01)

(52) U.S. Cl.
CPC ..... *G02B 6/29338* (2013.01); *G02B 6/29397* (2013.01); *G02B 2006/12116* (2013.01)

(56) References Cited

U.S. PATENT DOCUMENTS 9,746,747 B2 * 8/2017 Testa ................. G02F 1/313
2008/0123188 A1   5/2008 Klein et al.
2013/0039618 A1   2/2013 Kimerling et al.

FOREIGN PATENT DOCUMENTS

| CN | 101866066 A | 10/2010 |
| CN | 103986671 A | 8/2014 |
| JP | H0943558 A | 2/1997 |

OTHER PUBLICATIONS

Liu Liu et al., "Silicon-on-insulator polarization splitting and rotating device for polarization diversity circuits reference and links", IEEE J. Sel. Top. Quantum Electron. Express, Jan. 1, 2005, 6 pages, XP055417668.

Yunhong et al., "Elastic polarization converter based on dual microring resonators", IEEE Journal of Quantum Electronics, vol. 45, No. 8, Aug. 1, 2009, 6 pages, XP011264014.

Darmawan S et al., "Nested ring Mach-Zehnder interferometer", Optics Express, OSA Publishing, US, vol. 15, No. 2, Jan. 1, 2007, 12 pages, XP002487661.

Xiaoyan Yu, "Modeling of Microring Resonator by Coupled Mode Theory," From the Internet: www.cnki.net, Aug. 2008, 96 pages, with partial English translation.

Jing Hu, "Silicon Microring Resonators and the Application to Optical Sensing with Ultra-high Sensitivity," From the internet: www.cnki.net, Sep. 19, 2012, 129 pages, with English abstract.

* cited by examiner

MICRO-RING RESONATOR

CROSS-REFERENCE TO RELATED APPLICATIONS

This application is a continuation of International Application No. PCT/CN2014/093612, filed on Dec. 11, 2014, the disclosure of which is hereby incorporated by reference in its entirety.

TECHNICAL FIELD

The present invention relates to the field of optical communications, and in particular, to a micro-ring resonator.

BACKGROUND

With continuous expansion and upgrade of a network, to control costs and power consumption, optical modules are inevitably developing toward miniaturization. To achieve this objective, sizes of optical components and circuits in the optical modules need to be reduced. However, a method for reducing the sizes of the optical components is mainly to replace conventional discrete optical components with integrated waveguide components having a high refractive index difference. In the prior art, common waveguide materials having a high refractive index difference include silicon, silicon nitride, polymer (for example, SU8), and III-V compound semiconductor materials such as InP. Optical components made of these materials have a very strong polarization correlation, that is, transverse electric (Transverse Electric, TE) mode polarized light and transverse magnetic (Transverse Magnetic, TM) mode polarized light have different operating wavelengths. However, some network applications require that optical components in a receiver should have a polarization-insensitive feature, that is, require that operating wavelengths of TE polarized light and TM polarized light should be the same.

FIG. 1 shows a schematic structural diagram of a micro-ring resonator provided by the prior art. As shown in FIG. 1, input light in an unknown polarization state is split by a polarization splitter (Polarization Splitter, PS) into TE light and TM light, which are respectively processed by using micro-ring resonators having a same operating wavelength and then undergo polarization combination by using a polarization combiner (Polarization Combiner, PC). It is required that operating wavelengths of the two micro-rings should be the same, and that included waveguides should have a strong polarization correlation. Radii of the micro-rings are different, and are R and R' respectively. In order that the two micro-rings are not coupled to each other, it is assumed that a minimum distance between the micro-rings is Gap. In the used solution in FIG. 1, a distance between components is limited by a resonator radius, and is at least 2*R+2*R'+Gap, and cannot be further reduced. A disadvantage of the solution in FIG. 1 is that two sets of components need to be used, and that control complexity and power consumption are both doubled. Secondly, in the used solution, a difference between operating wavelengths of TE polarized light and TM polarized light is limited by a current process level and a minimum distance between micro-rings, and requirements of dense wavelength multiplexing (Dense Wavelength Division Multiplexing, DWDM) applications cannot be satisfied.

SUMMARY

In view of this, embodiments of the present invention provide a micro-ring resonator to resolve a technical problem that currently micro-ring resonators in the prior art have a strong polarization correlation.

According to a first aspect, an embodiment of the present invention discloses a micro-ring resonator, including: a first straight waveguide; a second waveguide and a third waveguide, where the second waveguide and the third waveguide form a closed annular waveguide or form an unclosed helical waveguide, and the annular waveguide is coupled to the first straight waveguide; a fourth waveguide, where the fourth waveguide is arc-shaped and coupled to the third waveguide; and a polarization splitter, where one end of the polarization splitter is connected to the fourth waveguide, and one end is connected to the second waveguide in the annular waveguide.

With reference to the first aspect, in a first possible implementation of the first aspect, the micro-ring resonator satisfies the following formula: $Neff(TE) \times (L(\text{second waveguide}) + L(\text{third waveguide})) = Neff(TM) \times (L(\text{second waveguide}) + L(\text{fourth waveguide})) = m \times \lambda(TE) = m \times \lambda(TM)$; where Neff is used to indicate an effective refractive index, $Neff(TE)$ is used to indicate an effective refractive index of transverse electric TE mode light, L is used to indicate a length of a waveguide, L (second waveguide) is used to indicate a length of the second waveguide, m is used to indicate a resonance level, $\lambda$ is used to indicate a wavelength, and $\lambda(TE)$ is used to indicate a wavelength of the transverse electric TE mode light.

With reference to the first aspect or the first possible implementation of the first aspect, in a second possible implementation of the first aspect, a quantity of first straight waveguides is one or two or more.

With reference to any possible implementation of the first aspect, in a third possible implementation of the first aspect, one or some or all of the second waveguide, the third waveguide, and the fourth waveguide are bending waveguides.

With reference to the first aspect, and the first to the second possible implementations of the first aspect, in a fourth possible implementation of the first aspect, one or some or all of the second waveguide, the third waveguide, and the fourth waveguide are straight waveguides.

With reference to any possible implementation of the first aspect, in a fifth possible implementation of the first aspect, the micro-ring resonator further includes a micro heater, where the micro heater is coupled between the third waveguide and the fourth waveguide.

With reference to any possible implementation of the first aspect, in a sixth possible implementation of the first aspect, an absorption layer is deposited on the second waveguide, and a material of the absorption layer is one of germanium, silicon, or tin, or a combination thereof, or a III-V compound material.

With reference to any possible implementation of the first aspect, in a seventh possible implementation of the first aspect, sectional structures of the first waveguide, the second waveguide, the third waveguide, and the fourth waveguide are strip-shaped or ridge-shaped.

According to a second aspect, a micro-ring resonator includes: a first straight waveguide; a second waveguide and a third waveguide, where the second waveguide and the third waveguide form an arc waveguide, and the arc waveguide is coupled to the first waveguide; and a polarization splitter, where the polarization splitter and the arc waveguide form a closed ring.

With reference to the second aspect, in a first possible implementation of the second aspect, the micro-ring resonator satisfies the following formula: $Neff(TE) \times L(\text{perimeter}$ of the closed ring)+Neff(TM)×L(perimeter of the closed ring)=m×λ(TE)=m×λ(TM); where Neff is used to indicate an effective refractive index, Neff (TE) is used to indicate an effective refractive index of transverse electric TE mode light, L is used to indicate a length of a waveguide, L (perimeter of the closed ring) is used to indicate the perimeter of the closed ring formed by the second waveguide, the third waveguide, and the polarization splitter, m is used to indicate a resonance level, λ is used to indicate a wavelength, and λ(TE) is used to indicate a wavelength of the transverse electric TE mode light.

With reference to the second aspect or the first possible implementation of the second aspect, in a second possible implementation of the second aspect, a quantity of first straight waveguides is one or two or more.

With reference to any possible implementation of the second aspect, in a third possible implementation of the second aspect, one or both of the second waveguide and the third waveguide are bending waveguides.

With reference to any possible implementation of the second aspect, in a fourth possible implementation of the second aspect, one or both of the second waveguide and the third waveguide are straight waveguides.

With reference to any possible implementation of the second aspect, in a fifth possible implementation of the second aspect, an absorption layer is deposited on the second waveguide, and a material of the absorption layer is one of germanium, silicon, or tin, or a combination thereof, or a III-V compound material.

With reference to any possible implementation of the second aspect, in a sixth possible implementation of the second aspect, sectional structures of the first waveguide, the second waveguide, and the third waveguide are strip-shaped or ridge-shaped.

BRIEF DESCRIPTION OF DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiment 1

Embodiment 1 of the present invention provides a novel micro-ring resonator. An operating wavelength of a TE optical path is made consistent with that of a TM optical path by using a common waveguide and two polarization splitters PSs. In the solution disclosed by Embodiment 1 of the present invention, a distance between the TE optical path and the TM optical path breaks a limitation of a micro-ring radius, and a difference between operating wavelengths that is caused by a process error can be better reduced.

The micro-ring resonator provided by Embodiment 1 of the present invention includes: a first straight waveguide; a second waveguide and a third waveguide, where the second waveguide and the third waveguide form a closed annular waveguide, and the annular waveguide is coupled to the first straight waveguide; a fourth waveguide, where the fourth waveguide is arc-shaped and coupled to the third waveguide; and a polarization splitter, where one end of the polarization splitter is connected to the fourth waveguide, and one end is connected to the second waveguide in the annular waveguide.

Figure 1:
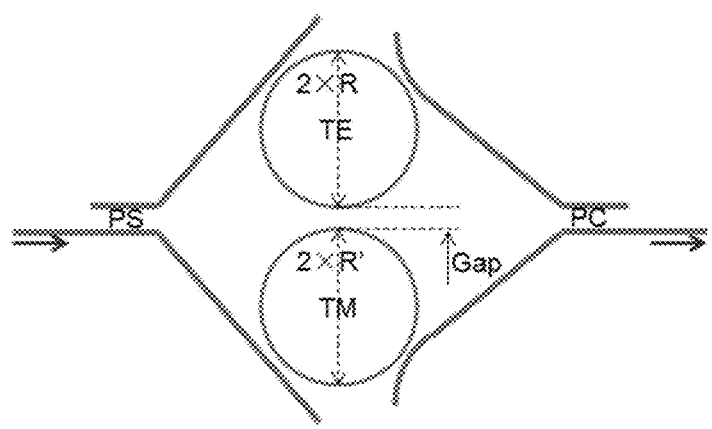
FIG. 1 is a schematic structural diagram of a micro-ring resonator provided by the prior art.
Figure 2:
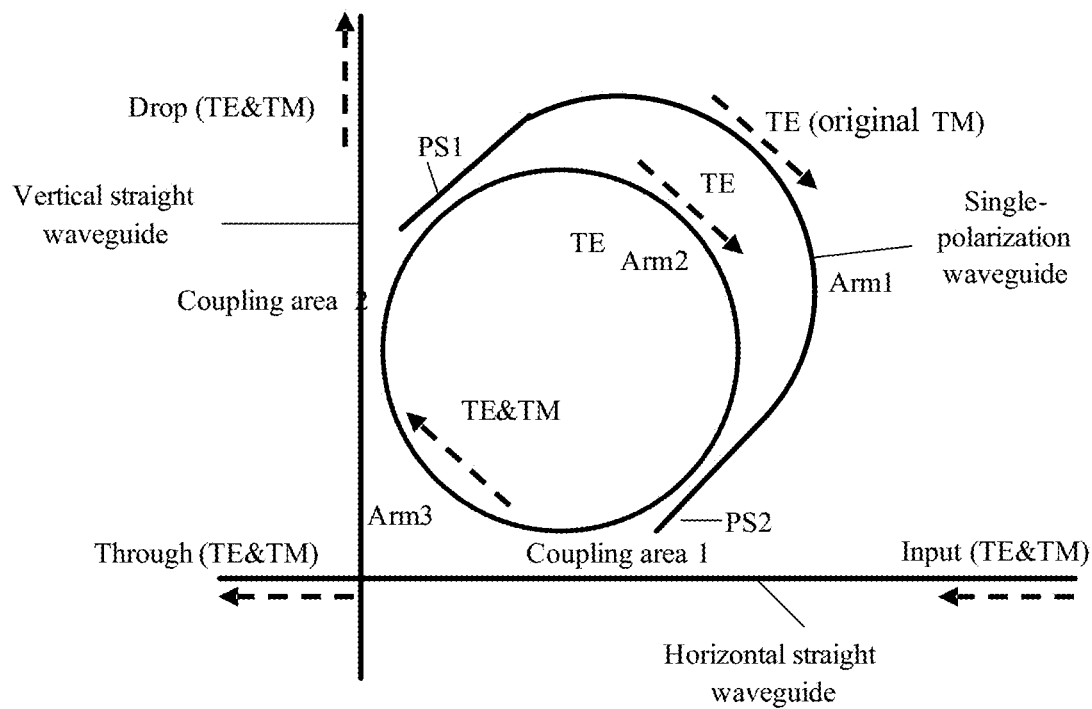
FIG. 2 is a schematic structural diagram of a micro-ring resonator according to Embodiment 1 of the present invention.

Specifically, a structure of the micro-ring resonator provided in this embodiment of the present invention is shown in FIG. 2, including two straight waveguides that are vertical to each other (in FIG. 2, a horizontal line is a horizontal straight waveguide, and a vertical line is a vertical straight waveguide), an annular waveguide, two polarization splitters PS1 and PS2 that are coupled to the annular waveguide, and a bending waveguide (which may also be referred to as a single-polarization waveguide) connected to the two PSs. The annular waveguide in FIG. 2 is marked with an Arm3 and an Arm2. A half arc near a lower side is the Arm3, and the other half arc is the Arm2. The annular waveguide is an entirety, and is marked segment by segment with the Arm3 and the Arm2 for subsequent description of the principle of the present invention. The annular waveguide is represented by a circular structure in FIG. 2. It should be noted that, an appearance of the annular waveguide is not necessarily a regular circle, but may be a circle, an ellipse, or a circle-like form with irregular edges, so long as the annular waveguide is in a closed annular form having a start point coinciding with an endpoint. The annular waveguide is coupled to the two straight waveguides that are vertical to each other. A coupling manner is that the annular waveguide is located in a first quadrant formed by the two straight waveguides in the structure shown in FIG. 2. Further, there are two polarization splitters respectively coupled to the annular waveguide. The two polarization splitters are respectively located in a second coupling area in which the annular waveguide is coupled to the vertical waveguide and a first coupling area in which the annular waveguide is coupled to the horizontal waveguide.

An operating principle of the micro-ring resonator provided in this embodiment of the present invention is as follows:

Input light in an unknown polarization state is input from an input port on a right side in FIG. 2. Through a coupling in the coupling area 1 (the coupling area in which the annular waveguide is coupled to the horizontal straight waveguide), the input light enters the annular waveguide. In the coupling area 1, the Arm3, and the coupling area 2, TE polarized light and TM polarized light exist simultaneously. After the TE polarized light passes through the first polarization splitter PS1, a path of the TE polarized light is a route shown by the Arm2 in FIG. 2. After the TM polarized light passes through the PS1, the polarization state is rotated to TE, and a path of the light thereof is a route shown by an Arm1 in FIG. 2. After the input light is transmitted through the Arm1 and the Arm2 separately, all the light enters the second polarization splitter PS2. After the TE polarized light passes through the PS2, the polarization state of the TE polarized light keeps unchanged, and the TE polarized light enters the coupling area 1. The polarization state of the original TM polarized light (before the light enters the PS2, the polarization state is TE) is rotated, and the light becomes TM polarized light again and enters the coupling area 1. Because the light continuously resonates in the "ring", a phenomenon of multi-beam interference occurs in the coupling area 1 and the coupling area 2 respectively. Light with interference intensified in the coupling area 1 is emitted from an output port (Through port in FIG. 2). Remaining light with interference canceled in the coupling area 1 but with interference intensified in the coupling area 2 is emitted from another output port (Drop port in FIG. 2).

An optical path difference generated by a length difference of the Arm1 and the Arm2 in this embodiment of the present invention is used to compensate for an optical path difference that exists due to different TE and TM polarizations in the Arm3. Therefore, it is ensured that optical paths of the TE polarized light and the TM polarized light are consistent, that is, operating wavelengths of the TE polarized light and the TM polarized light are consistent, and an objective of polarization insensitivity of a component is achieved. Alternatively, it is ensured that one-way phase changes of the TE polarized light and the TM polarized light are consistent, as shown in the following formula:

$$N\text{eff}(TE) \times (L(\text{Arm3}) + L(\text{Arm2})) = N\text{eff}(TM) \times (L(\text{Arm3}) + L(\text{Arm1})) = m \times \lambda(TE) = m \times \lambda(TM);$$

where Neff is used to indicate an effective refractive index (Effective Refractive Index, Neff), Neff (TE) is used to indicate an effective refractive index of TE light, L is used to indicate a length of a waveguide, L (Arm3) is used to indicate a length of the waveguide Arm3, m is used to indicate a resonance level, λ is used to indicate a wavelength, and λ(TE) is used to indicate a wavelength of the TE light.

Further, straight waveguides may be used to replace the bending waveguides shown by the Arm1 and the Arm2, so as to minimize polarization rotations that possibly occur in the waveguides.

Figure 3:
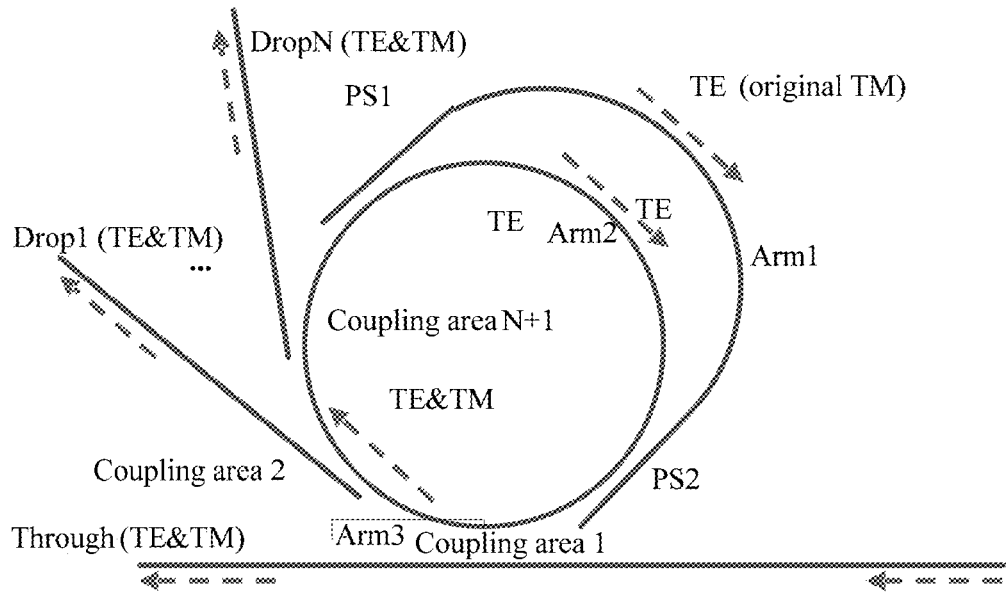
FIG. 3 is a schematic structural diagram of another micro-ring resonator according to Embodiment 1 of the present invention.

Further, a quantity of straight waveguides in FIG. 2 may also be one or more. FIG. 3 is a schematic structural diagram in which multiple straight waveguides are coupled to one annular waveguide. In FIG. 3, a horizontal waveguide is a first straight waveguide, the one that tilts in a direction Drop1 is a second straight waveguide, and the one that tilts in a direction DropN is an $N^{th}$ straight waveguide. Coupling relationships between the annular waveguide and a bending waveguide and polarization splitters are the same as those in FIG. 2. The following describes a principle for coupling the multiple straight waveguides to the annular waveguide shown in FIG. 3.

Input light in an unknown polarization state is input from an input port. Through coupling in a coupling area 1, the input light enters a micro-ring resonator. In the coupling area 1, an Arm3, and a coupling area 2 to a coupling area N+1, TE polarized light and TM polarized light exist simultaneously. After the TE polarized light passes through a first polarization splitter PS1, a path of the TE polarized light is a route shown by an Arm2 in FIG. 3. After the TM polarized light passes through the PS1, the polarization state is rotated to TE, and a path of the light thereof is the route shown by an Arm1 in FIG. 3. After being transmitted through the Arm1 and the Arm2, all the light enters a second polarization splitter PS2. After the TE polarized light passes through the PS2, the polarization state of the TE polarized light keeps unchanged, and the TE polarized light enters the coupling area 1. The polarization state of the original TM polarized light (before the light enters the PS2, the polarization state is TE) is rotated, and the light becomes TM polarized light again and enters the coupling area 1. Because the light continuously resonates in the "ring", a phenomenon of multi-beam interference occurs in the coupling area 1 and the coupling area 2 to the coupling area N+1 respectively. Light with interference intensified in the coupling area 1 is output from a Through port. Remaining light with interference canceled in the coupling area 1 but with interference intensified in the coupling area 2 to the coupling area N+1 is output from Drop1 to DropN respectively according to equal power.

An optical path difference generated by a length difference of the Arm1 and the Arm2 is used to compensate for an optical path difference that exists due to different TE and TM polarizations in the Arm3. Therefore, it is ensured that optical paths of the TE polarized light and the TM polarized light are consistent, that is, operating wavelengths of the TE polarized light and the TM polarized light are consistent, and an objective of polarization insensitivity of a component is achieved. Alternatively, it is ensured that one-way phase changes of the TE polarized light and the TM polarized light are consistent, as shown in the following formula:

$$N\text{eff}(TE) \times (L(\text{Arm3}) + L(\text{Arm2})) = N\text{eff}(TM) \times (L(\text{Arm3}) + L(\text{Arm1})) = m \times \lambda(TE) = m \times \lambda(TM).$$

Figure 4:
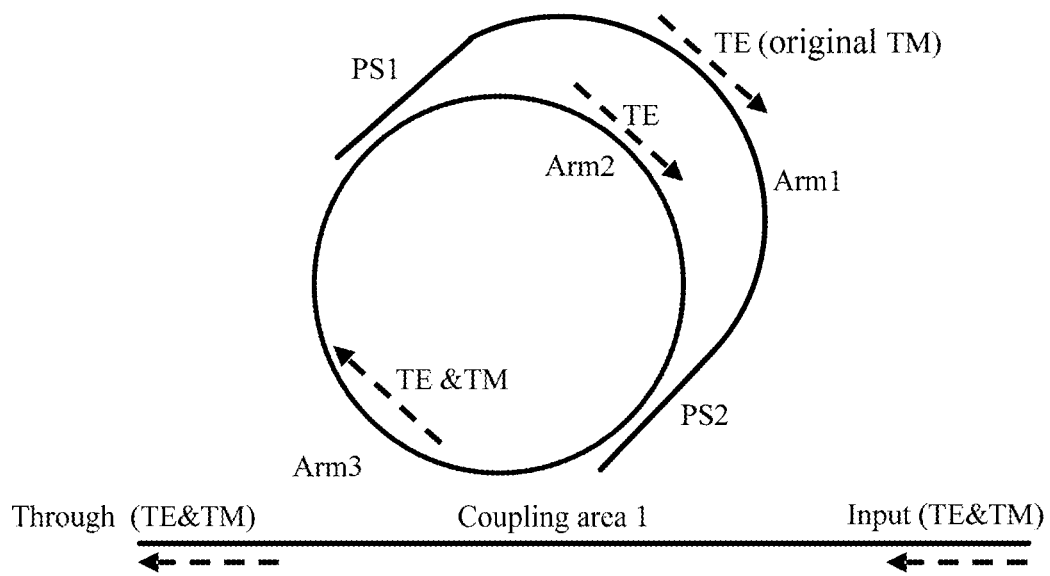
FIG. 4 is a schematic structural diagram of another micro-ring resonator according to Embodiment 1 of the present invention.

Further, FIG. 4 shows a structure of a micro-ring resonator in which a single straight waveguide is coupled to a semi-annular waveguide. As shown in FIG. 4, light in an unknown polarization state is input from an input port, and passes through optical paths in a coupling area 1, a PS1, an Arm1, and an Arm2. An operating principle is consistent with that of the foregoing embodiment, and details are not described again herein. A difference lies in an operating feature of a PS2. After TE polarized light passes through the PS2, the polarization state of the TE polarized light is rotated and becomes TM polarized, and the light enters the coupling area 1. The polarization state of original TM polarized light (before the light enters the PS2, the polarization state is TE) keeps unchanged and is still TE, and the light enters the coupling area 1. In this case, average optical paths of the TE polarized light and the TM polarized light are completely consistent, and no length compensation is required in the Arm1 and the Arm2. Alternatively, it is ensured that one-way phase changes of the TE polarized light and the TM polarized light are consistent, as shown in the following formula:

$$N\text{eff}(TE) \times (L(\text{Arm3}) + L(\text{Arm2})) = N\text{eff}(TM) \times (L(\text{Arm3}) + L(\text{Arm1})) = m \times \lambda(TE) = m \times \lambda(TM).$$

Straight waveguides may be used to replace the bending waveguides shown by the Arm1 and the Arm2, so as to reduce polarization rotation phenomena that possibly exist in the waveguides.

Figure 5A:
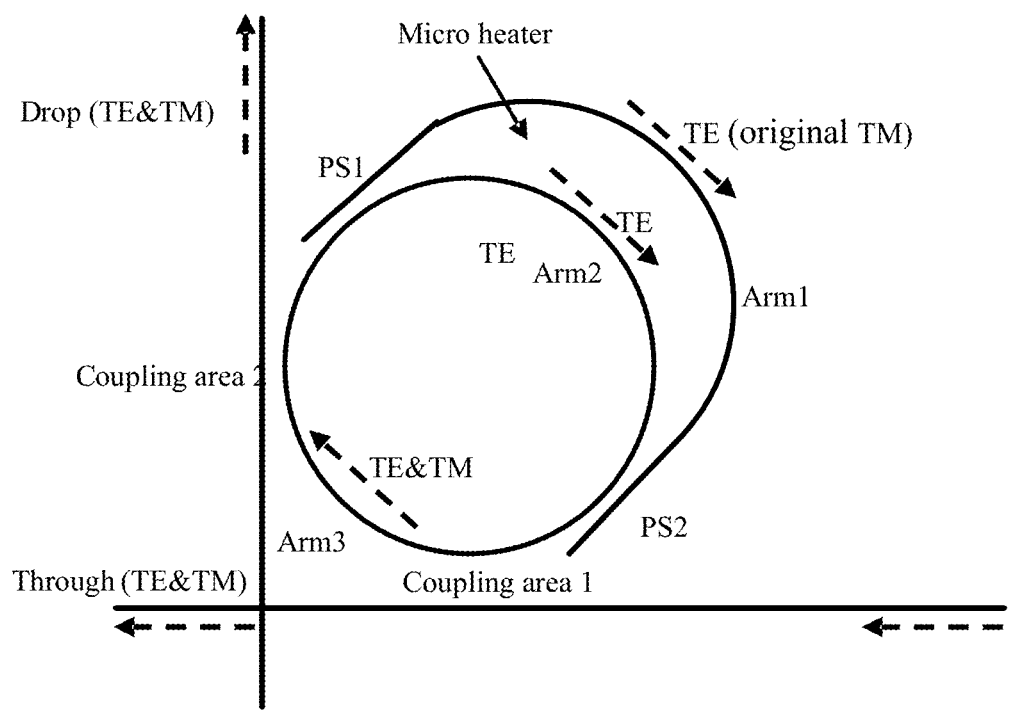
FIG. 5A is a schematic structural diagram of another micro-ring resonator according to Embodiment 1 of the present invention.

Optionally, in the micro-ring resonator provided in this embodiment of the present invention, as shown in FIG. 5A, a micro heater (Micro Heater, MH) may be coupled between the waveguides Arm1 and Arm2, and this micro heater is used to control the two waveguides, so that some of capabilities that originally may be wasted are fully used. The heater is represented by a yellow arc curve in FIG. 5A.

Figure 5B:
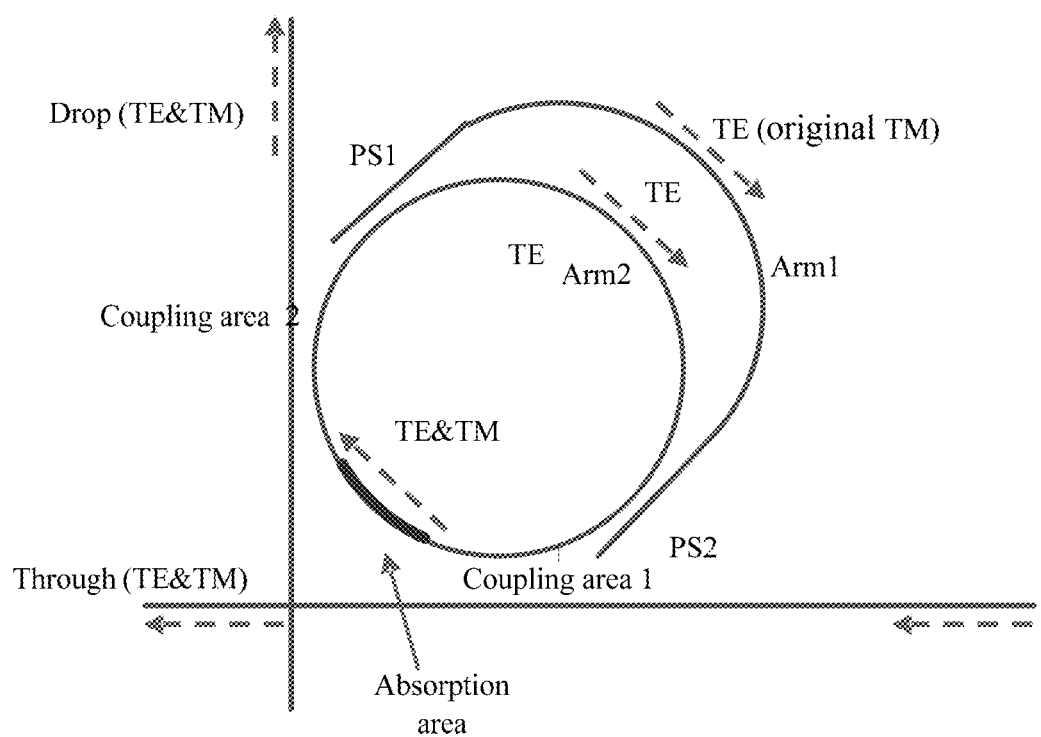
FIG. 5B is a schematic structural diagram of another micro-ring resonator according to Embodiment 1 of the present invention.

Further, in the micro-ring resonator provided in this embodiment of the present invention, an absorption layer may also be deposited on the waveguide Arm3, so that a function of a polarization-insensitive resonant detector can be implemented. The absorption layer is a red arc part in FIG. 5B. A material of the absorption layer is one of germanium, silicon, or tin, or a combination thereof, or a III-V compound material (for example, InP or InGaAsP). In comparison with the prior art, absorption layer materials used in this embodiment of the present invention are reduced by a half, noise is reduced by a half, and therefore, receiver sensitivity may be higher. In particular, for silicon-germanium series of absorption layer materials having great noise, noise is a main factor that affects receiver sensitivity of the materials at a high temperature, and an effect of noise reduction for improving receiver sensitivity is better.

Further, a material of the foregoing waveguide may be one of germanium, silicon, or tin, or a combination thereof, or a III-V compound material, or silicon nitride, or polymer.

Further, a sectional structure of the foregoing waveguide may be strip-shaped or thin-Slab ridge-shaped, or different parts of the waveguide use different waveguide sectional structures.

In the solution used in this embodiment of the present invention, a PS is built in a resonant loop, a distance between two waveguides for separately transmitting different polarized light breaks a limitation of a resonator radius, and further, a distance between a TE path and a TM path is reduced. Therefore, a difference between operating wavelengths of polarized light of the resonator that is generated by a process error is reduced, and a scenario having a stricter requirement on this indicator can be satisfied. Secondly, TE light and TM light are designed to have a same operating wavelength, and polarization interference is not increased even if a polarization rotation occurs. A sectional shape of a waveguide may be designed randomly, and no special sectional shape needs to be used to inhibit a polarization rotation.

Embodiment 2

This embodiment of the present invention provides another micro-ring resonator, including: a first straight waveguide; a second waveguide and a third waveguide, where the second waveguide and the third waveguide form a closed annular waveguide or form an unclosed helical waveguide, and the annular waveguide is coupled to the first straight waveguide; a fourth waveguide, where the fourth waveguide is arc-shaped and coupled to the third waveguide; and a polarization splitter, where one end of the polarization splitter is connected to the fourth waveguide, and one end is connected to the second waveguide in the annular waveguide.

Figure 6:
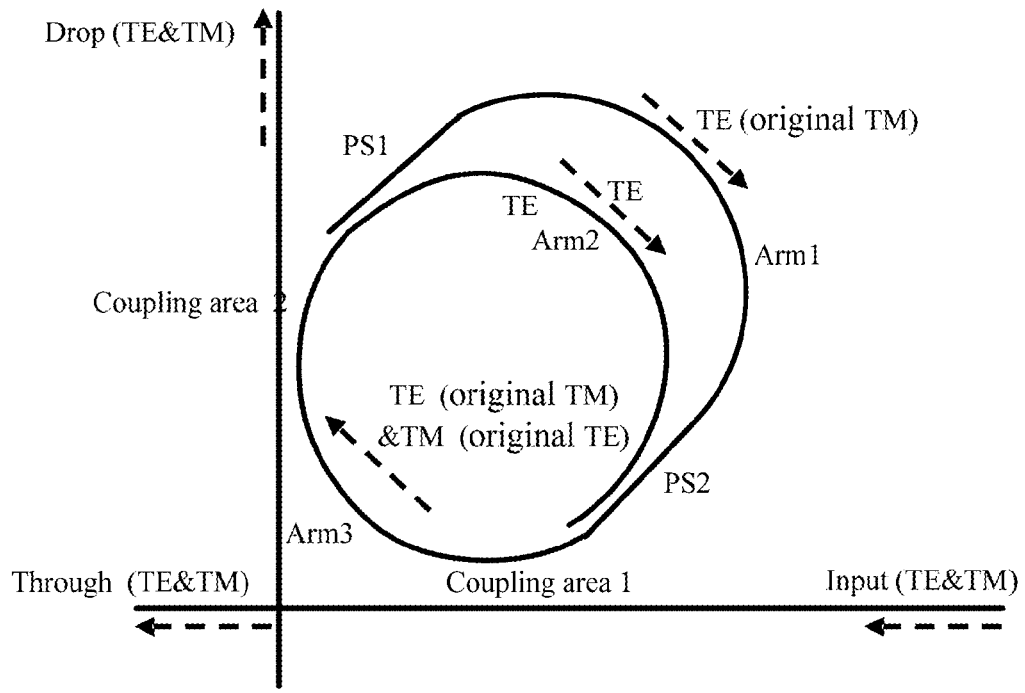
FIG. 6 is a schematic structural diagram of another micro-ring resonator according to Embodiment 2 of the present invention.

Specifically, a structure of the micro-ring resonator is shown in FIG. 6, including two straight waveguides that are vertical to each other (in FIG. 6, a horizontal line and a vertical line respectively represent two straight waveguides that are vertical to each other), an unclosed annular waveguide (it is an unclosed "annular" waveguide having a helical structure formed by two segments of waveguides Arm2 and Arm3 in FIG. 6; it should be noted that, an appearance of the "ring" is not necessarily a regular circle, but may be a circle, an ellipse, or a circle-like form with irregular edges), two polarization splitters PS1 and PS2 that are coupled to the annular waveguide, and a waveguide Arm1 connected to the two PSs.

A principle of the micro-ring resonator provided in this embodiment of the present invention is described is as follows:

From an input port, light in an unknown polarization state passes through optical paths in a coupling area 1, a coupling area 2, the PS1, the Arm1, and the Arm2. An operating principle is the same as that in Embodiment 1, and details are not described again herein. A difference lies in an operating feature of the PS2. After TE polarized light passes through the PS2, the polarization state of the TE polarized light is rotated and becomes TE polarized, and the light enters the coupling area 1. The polarization state of original TM polarized light (before the light enters the PS2, the polarization state is TE) keeps unchanged and is still TE, and the light enters the coupling area 1. In this case, average optical paths of the TE polarized light and the TM polarized light are consistent, and no length compensation is required in the Arm1 and the Arm2. Alternatively, it is ensured that one-way phase changes of the TE polarized light and the TM polarized light are consistent, as shown in the following formula:

$$N\text{eff}(TE) \times (L(\text{Arm3}) + L(\text{Arm2})) = N\text{eff}(TM) \times (L(\text{Arm3}) + L(\text{Arm1})) = m \times \lambda(TE) = m \times \lambda(TM).$$

where Neff is used to indicate an effective refractive index (Effective Refractive Index, Neff), Neff (TE) is used to indicate an effective refractive index of TE light, L is used to indicate a length of a waveguide, L (Arm3) is used to indicate a length of the waveguide Arm3, m is used to indicate a resonance level, $\lambda$ is used to indicate a wavelength, and $\lambda$(TE) is used to indicate a wavelength of the TE light.

Because the light continuously resonates in the "ring", a phenomenon of multi-beam interference occurs in the coupling area 1 and the coupling area 2 respectively. Light with interference intensified in the coupling area 1 is output from a Through port. Remaining light with interference canceled in the coupling area 1 but with interference intensified in the coupling area 2 is output from a Drop port.

Further, straight waveguides may be used to replace bending waveguides shown by the Arm1 and the Arm2.

Figure 7:
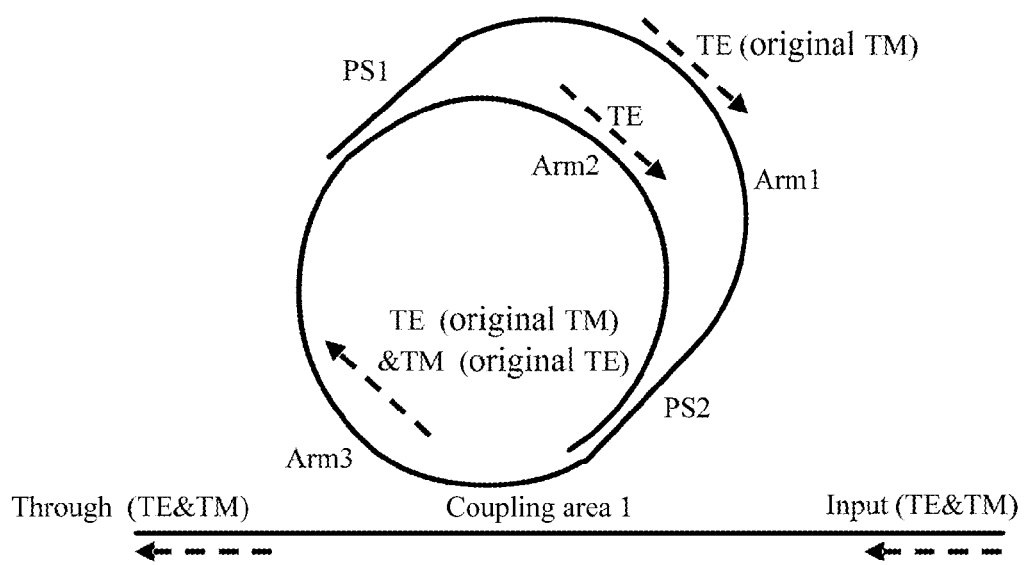
FIG. 7 is a schematic structural diagram of another micro-ring resonator according to Embodiment 2 of the present invention.

Likewise, a quantity of straight waveguides in Embodiment 2 may be one or more. FIG. 7 shows a structure in which one straight waveguide is coupled to a so-called "ring" (that is, an unclosed helical waveguide formed by an Arm1 and an Arm2). As shown in FIG. 7, a principle is described as follows:

From an input port, light in an unknown polarization state passes through optical paths in a coupling area 1, a PS1, the Arm1, and the Arm2. An operating principle is the same as that in Embodiment 1. A difference lies in an operating feature of a PS2. After TE polarized light passes through the PS2, the polarization state of the TE polarized light is rotated and becomes TM polarized, and the light enters the coupling area 1. The polarization state of original TM polarized light (before the light enters the PS2, the polarization state is TE) keeps unchanged and is still TE, and the light enters the coupling area 1. In this case, average optical paths of the TE polarized light and the TM polarized light are completely consistent, and no length compensation is required in the Arm1 and the Arm2. Alternatively, it is ensured that one-way phase changes of the TE polarized light and the TM polarized light are consistent, that is, this embodiment of the present invention satisfies the following formula:

$$Neff(TE) \times (L(Arm3)+L(Arm2)) = Neff(TM) \times (L(Arm3)+L(Arm1)) = m \times \lambda(TE) = m \times \lambda(TM).$$

Because the light continuously resonates in the "ring", a phenomenon of multi-beam interference occurs in the coupling area and a coupling area 2 respectively. Light with interference intensified in the coupling area 1 is output from a Through port.

Straight waveguides may be used to replace bending waveguides shown by the Arm1 and the Arm2.

Figure 8:
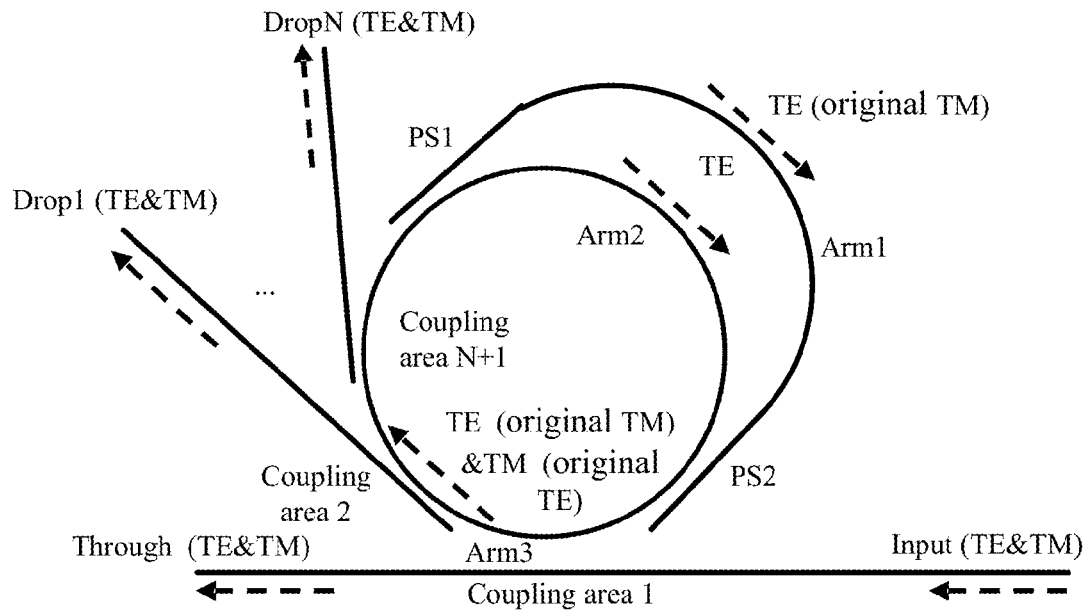
FIG. 8 is a schematic structural diagram of another micro-ring resonator according to Embodiment 2 of the present invention.

FIG. 8 shows a structure in which multiple straight waveguides are coupled to a so-called "ring". As shown in FIG. 8, from an input port, light in an unknown polarization state passes through optical paths in a coupling area 1, a coupling area 2 to a coupling area N+1, a PS1, an Arm1, and an Arm2. An operating principle is the same as that in Embodiment 1. A difference lies in an operating feature of a PS2. After TE polarized light passes through the PS2, the polarization state of the TE polarized light is rotated and becomes TM polarized, and the light enters the coupling area 1. The polarization state of original TM polarized light (before the light enters the PS2, the polarization state is TE) keeps unchanged and is still TE, and the light enters the coupling area 1. In this case, average optical paths of the TE polarized light and the TM polarized light are completely consistent, and no length compensation is required in the Arm1 and the Arm2. Alternatively, it is ensured that one-way phase changes of the TE polarized light and the TM polarized light are consistent, that is, this embodiment of the present invention satisfies the following formula:

$$Neff(TE) \times (L(Arm3)+L(Arm2)) = Neff(TM) \times (L(Arm3)+L(Arm1)) = m \times \lambda(TE) = m \times \lambda(TM).$$

Because the light continuously resonates in the "ring", a phenomenon of multi-beam interference occurs in the coupling area 1 and the coupling area 2 to the coupling area N+1 respectively. Light with interference intensified in the coupling area 1 is output from a Through port. Remaining light with interference canceled in the coupling area 1 but with interference intensified in the coupling area 2 to the coupling area N+1 is output from Drop1 to DropN according to equal power.

Straight waveguides may be used to replace bending waveguides shown by the Arm1 and the Arm2.

In the solution used and provided in this embodiment of the present invention, a PS is built in a resonant loop, TE light and TM light are designed to have a same operating wavelength, and polarization interference is not increased even if a polarization rotation occurs. A sectional shape of a waveguide may be designed randomly, and no special sectional shape needs to be used to inhibit a polarization rotation.

Figure 9A:
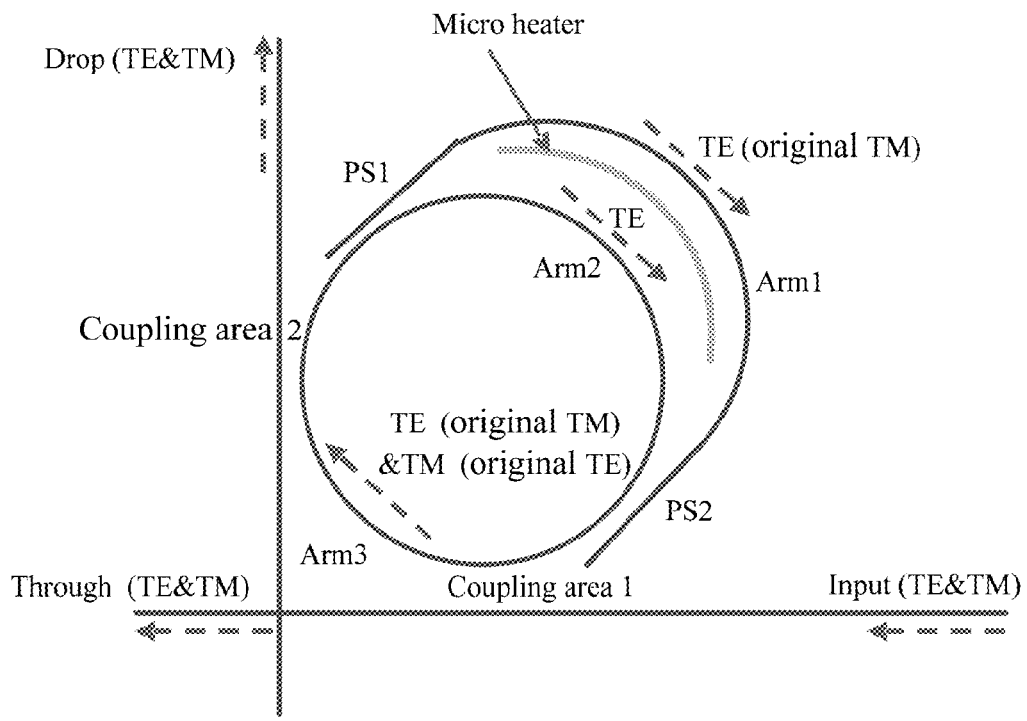
FIG. 9A is a schematic structural diagram of another micro-ring resonator according to Embodiment 2 of the present invention.
Figure 9B:
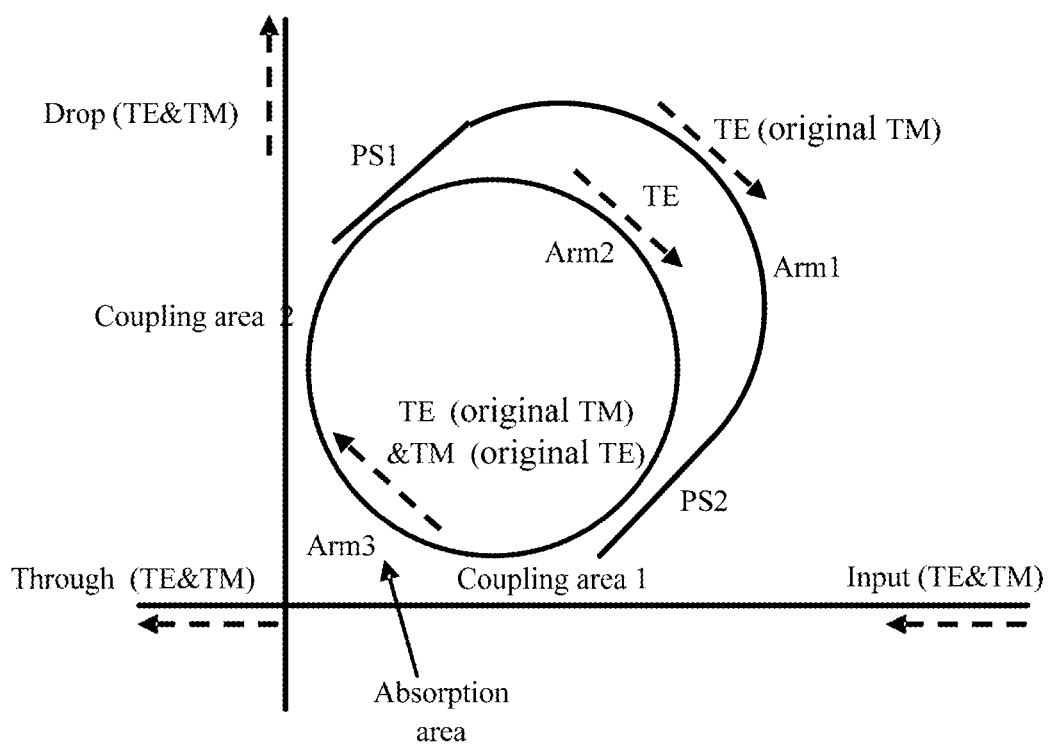
FIG. 9B is a schematic structural diagram of another micro-ring resonator according to Embodiment 2 of the present invention.

Further, generally, when a micro heater is used for heating components, heat is spread in all directions, and a large part of energy is wasted. In the micro-ring resonator provided in this embodiment of the present invention, as shown in FIG. 9A, a micro heater (Micro Heater, MH) may be coupled between the Arm1 and the Arm2, and this micro heater is used to control two rays of single-polarized light to pass through the waveguides, so that some of capabilities that originally may be wasted are fully used. The heater is a yellow arc curve in FIG. 9A.

Further, in the micro-ring resonator provided in this embodiment of the present invention, an absorption layer may also be deposited on the waveguide Arm3, so that a function of a polarization-insensitive resonant detector can be implemented. A material of the absorption layer is one of germanium, silicon, or tin, or a combination thereof, or a III-V compound semiconductor material (for example, InP or InGaAsP).

Further, a material of the foregoing waveguide may be one of germanium, silicon, or tin, or a combination thereof, or a III-V compound material (for example, InP or InGaAsP), or silicon nitride, or polymer (for example, SU8).

Further, a sectional structure of the foregoing waveguide may be strip-shaped or thin-Slab ridge-shaped, or different parts of the waveguide use different waveguide sectional structures.

In the solution used in this embodiment of the present invention, a PS is built in a resonant loop, a distance between two waveguides for separately transmitting different polarized light breaks a limitation of a resonator radius, and further, a distance between a TE path and a TM path is reduced. Therefore, a difference between operating wavelengths of polarized light of the resonator that is generated by a process error is reduced, and a scenario having a stricter requirement on this indicator can be satisfied. Secondly, TE light and TM light are designed to have a same operating wavelength, and polarization interference is not increased even if a polarization rotation occurs. A sectional shape of a waveguide may be designed randomly, and no special sectional shape needs to be used to inhibit a polarization rotation.

Embodiment 3

This embodiment of the present invention provides another micro-ring resonator, including: a first straight waveguide; a second waveguide and a third waveguide, where the second waveguide and the third waveguide form an arc waveguide, and the arc waveguide is coupled to the first waveguide; and a polarization splitter, where the polarization splitter and the arc waveguide form a closed ring.

Figure 10:
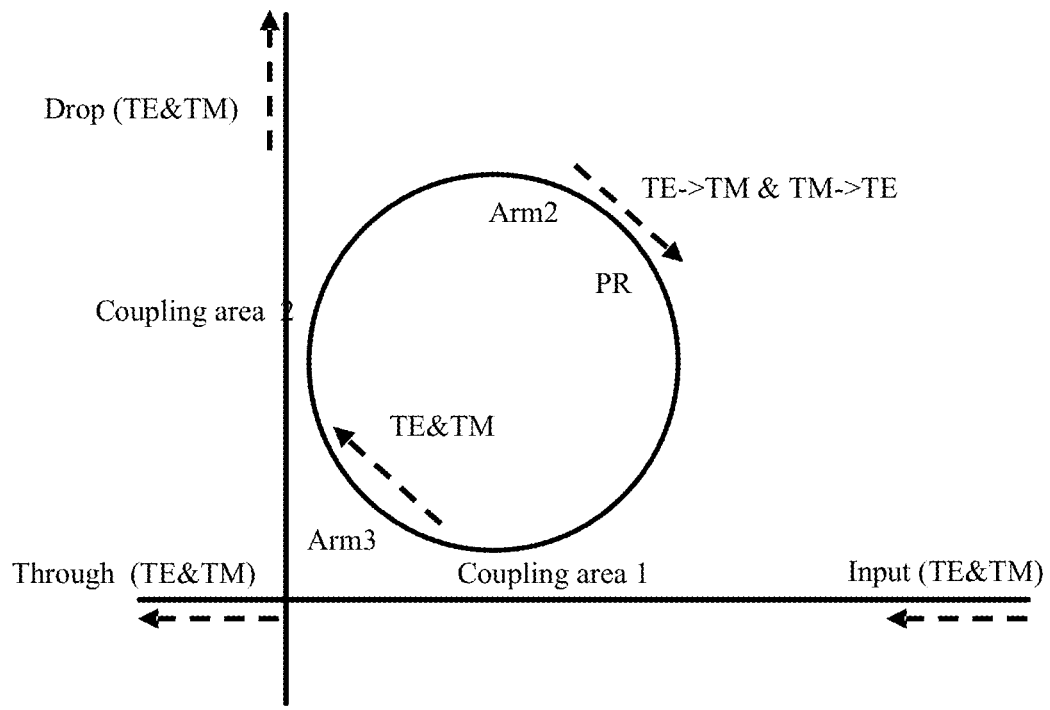
FIG. 10 is a schematic structural diagram of another micro-ring resonator according to Embodiment 3 of the present invention.

Specifically, a structure of the micro-ring resonator is shown in FIG. 10, including two straight waveguides that are vertical to each other (in FIG. 10, a horizontal line and a vertical line respectively represent two straight waveguides that are vertical to each other), an unclosed annular waveguide (or an arc waveguide formed by an Arm2 and an Arm3) and a polarization splitter PR coupled to the arc waveguide, where the arc waveguide and the PR are coupled to form a closed annular structure. It should be noted that, an appearance of the "ring" is not necessarily a regular circle, but may be a circle, an ellipse, or a circle-like form with irregular edges.

Input light in an unknown polarization state is input from an input port. Through coupling in a coupling area 1, the input light enters the micro-ring resonator. In the coupling area 1, the Arm3, and a coupling area 2, TE polarized light and TM polarized light exist simultaneously. After passing through the polarization splitter PR, the TE polarized light is rotated to become TM polarized light, and the TM polarized light is rotated to become TE polarized light. In every two cycles, total optical paths of the TE polarized light and the TM polarized light are consistent, corresponding operating wavelengths are consistent, and thereby polarization insensitivity is implemented. The following formula is satisfied:

$$Neff(TE) \times L(\text{perimeter of the ring}) + Neff(TM) \times L(\text{perimeter of the ring}) = m \times \lambda(TE) = m \times \lambda(TM);$$

where Neff is used to indicate an effective refractive index, Neff (TE) is used to indicate an effective refractive index of transverse electric TE mode light, L is used to indicate a length of a waveguide, L (perimeter of the closed ring) is used to indicate the perimeter of the closed ring formed by the second waveguide, the third waveguide, and the polarization splitter, m is used to indicate a resonance level, $\lambda$ is used to indicate a wavelength, and $\lambda(TE)$ is used to indicate a wavelength of the transverse electric TE mode light.

Because the light continuously resonates in the "ring", a phenomenon of multi-beam interference occurs in the coupling area 1 and the coupling area 2 respectively. Light with interference intensified in the coupling area 1 is output from a Through port. Remaining light with interference canceled in the coupling area 1 but with interference intensified in the coupling area 2 is output from a Drop port.

Figure 11:
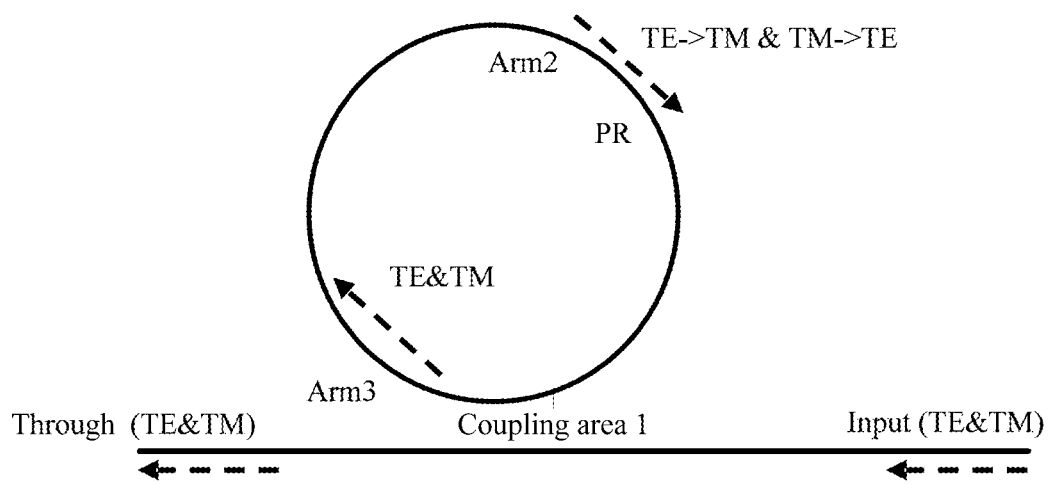
FIG. 11 is a schematic structural diagram of another micro-ring resonator according to Embodiment 3 of the present invention.

Likewise, a quantity of straight waveguides in Embodiment 3 may be one or more. FIG. 11 shows a structure in which one straight waveguide is coupled to a so-called "ring". A principle is described as follows:

Input light in an unknown polarization state is input from an input port. Through coupling in a coupling area 1, the input light enters a micro-ring resonator. In the coupling area 1 and an Arm3, TE polarized light and TM polarized light exist simultaneously. After passing through a PR, the TE polarized light is rotated to become TM polarized light, and the TM polarized light is rotated to become TE polarized light. In every two cycles, total optical paths of the TE polarized light and the TM polarized light are consistent, corresponding operating wavelengths are consistent, and thereby polarization insensitivity is implemented.

The following formula is satisfied:

$$Neff(TE) \times L(\text{perimeter of the ring}) + Neff(TM) \times L(\text{perimeter of the ring}) = m \times \lambda(TE) = m \times \lambda(TM);$$

where Neff is used to indicate an effective refractive index, Neff (TE) is used to indicate an effective refractive index of transverse electric TE mode light, L is used to indicate a length of a waveguide, L (perimeter of the closed ring) is used to indicate the perimeter of the closed ring formed by the second waveguide, the third waveguide, and the polarization splitter, m is used to indicate a resonance level, $\lambda$ is used to indicate a wavelength, and $\lambda(TE)$ is used to indicate a wavelength of the transverse electric TE mode light.

Because the light continuously resonates in the "ring", a phenomenon of multi-beam interference occurs in the coupling area 1. Light with interference intensified in the coupling area 1 is output from a Through port.

Figure 12:
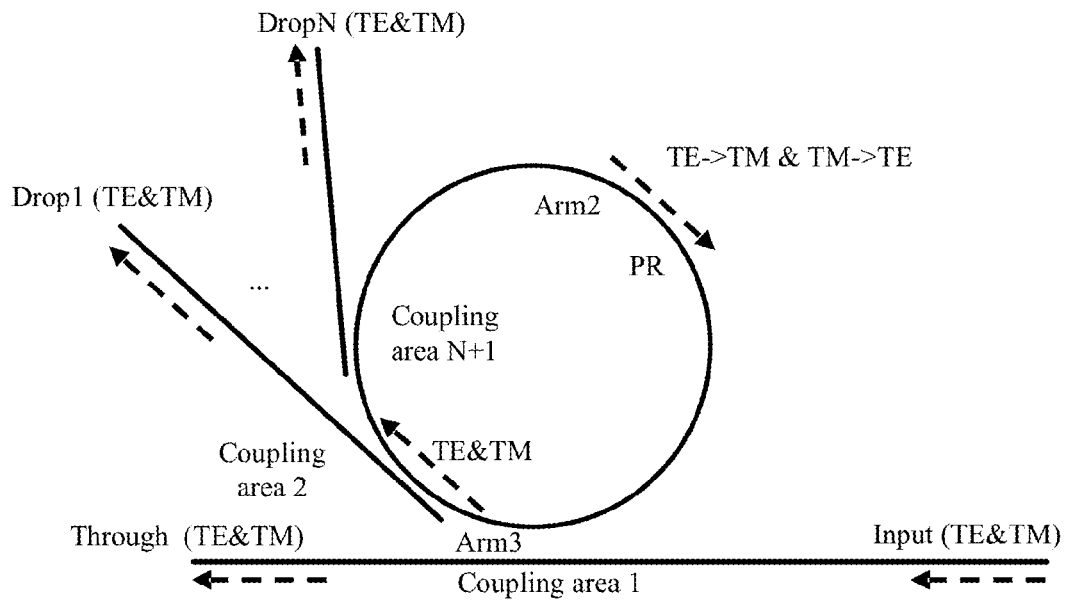
FIG. 12 is a schematic structural diagram of another micro-ring resonator according to Embodiment 3 of the present invention.
Figure 13:
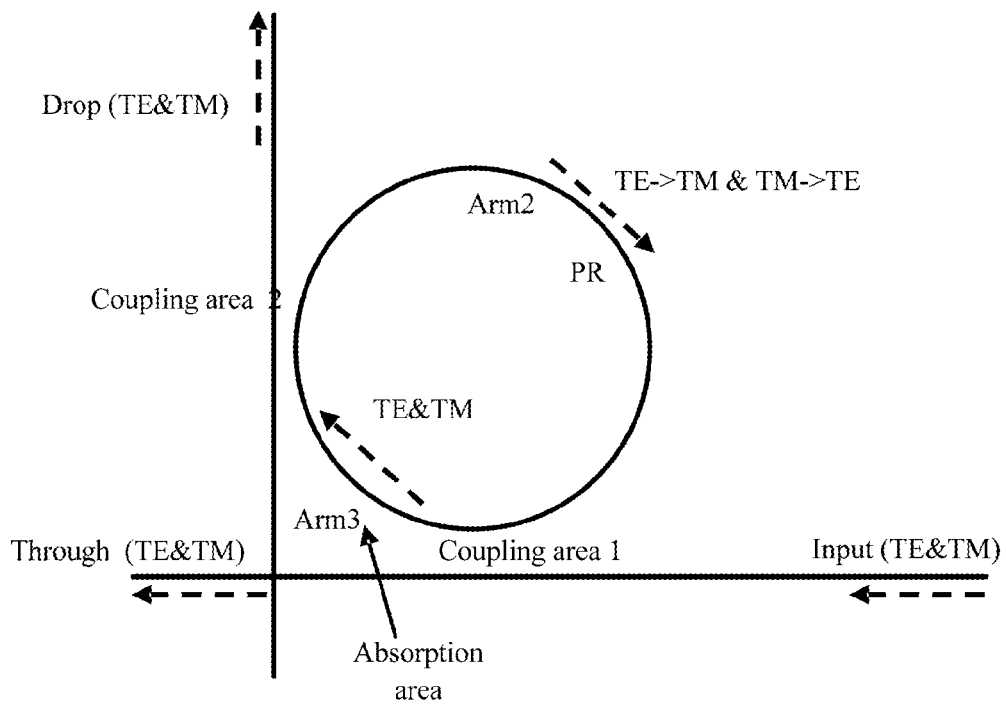
FIG. 13 is a schematic structural diagram of another micro-ring resonator according to Embodiment 3 of the present invention.

FIG. 12 shows a structure in which multiple straight waveguides are coupled to a so-called "ring". A principle is described as follows:

Input light in an unknown polarization state is input from an input port. Through coupling in a coupling area 1, the input light enters a micro-ring resonator. In the coupling area 1, an Arm3, and a coupling area 2 to a coupling area N+1, TE polarized light and TM polarized light exist simultaneously. After passing through a PR, the TE polarized light is rotated to become TM polarized light, and the TM polarized light is rotated to become TE polarized light. In every two cycles, total optical paths of the TE polarized light and the TM polarized light are consistent, corresponding operating wavelengths are consistent, and thereby polarization insensitivity is implemented.

Because the light continuously resonates in the "ring", a phenomenon of multi-beam interference occurs in the coupling area 1 and the coupling area 2 to the coupling area N+1 respectively. Light with interference intensified in the coupling area 1 is output from a Through port. Remaining light with interference canceled in the coupling area 1 but with interference intensified in the coupling area 2 to the coupling area N+1 is output from Drop1 to DropN according to equal power.

Further, in the micro-ring resonator provided in this embodiment of the present invention, an absorption layer may also be deposited on the waveguide Arm3, so that a function of a polarization-insensitive resonant detector can be implemented. A material of the absorption layer is one of germanium, silicon, or tin, or a combination thereof, or a III-V compound material (for example, InP or InGaAsP). In comparison with the prior art, absorption layer materials used in this embodiment of the present invention are reduced by a half, noise is reduced by a half, and therefore, receiver sensitivity may be higher.

Further, a material of the foregoing waveguide may be one of germanium, silicon, or tin, or a combination thereof, or a III-V compound material (for example, InP or InGaAsP), or silicon nitride, or polymer.

Further, a sectional structure of the foregoing waveguide may be strip-shaped or thin-Slab ridge-shaped, or different parts of the waveguide use different waveguide sectional structures.

In the solution used in this embodiment of the present invention, a PR is built in a resonant loop, a distance between two waveguides for separately transmitting different polarized light breaks a limitation of a resonator radius, and further, a distance between a TE path and a TM path is reduced. Therefore, a difference between operating wavelengths of polarized light of the resonator that is generated by a process error is reduced, and a scenario having a stricter requirement on this indicator can be satisfied. Secondly, TE light and TM light are designed to have a same operating wavelength, and polarization interference is not increased even if a polarization rotation occurs. A sectional shape of a waveguide may be designed randomly, and no special sectional shape needs to be used to inhibit a polarization rotation.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A micro-ring resonator, comprising:
a first straight waveguide;
a second waveguide and a third waveguide, wherein the second waveguide and the third waveguide form a closed annular waveguide or form an unclosed helical waveguide, and the annular waveguide or helical waveguide is coupled to the first straight waveguide;
a fourth waveguide, wherein the fourth waveguide is arc-shaped and coupled to the third waveguide; and
a polarization splitter, wherein one end of the polarization splitter is connected to the fourth waveguide, and one end is connected to the second waveguide in the annular waveguide or helical waveguide.

2. The micro-ring resonator according to claim 1, wherein the micro-ring resonator satisfies the following formula:

$$\mathit{Neff}(TE) \times (L(\text{second waveguide}) + L(\text{third waveguide})) = \mathit{Neff}(TM) \times (L(\text{second waveguide}) + L(\text{fourth waveguide})) = m \times \lambda(TE) = m \times \lambda(TM);$$

wherein Neff is used to indicate an effective refractive index, Neff (TE) is used to indicate an effective refractive index of transverse electric TE mode light, L is used to indicate a length of a waveguide, L (second waveguide) is used to indicate a length of the second waveguide, m is used to indicate a resonance level, $\lambda$ is used to indicate a wavelength, and $\lambda$(TE) is used to indicate a wavelength of the transverse electric TE mode light.

3. The micro-ring resonator according to claim 1, wherein a quantity of first straight waveguides is one or more.

4. The micro-ring resonator according to claim 1, wherein one or some or all of the second waveguide, the third waveguide, and the fourth waveguide are bending waveguides.

5. The micro-ring resonator according to claim 1, wherein one or some or all of the second waveguide, the third waveguide, and the fourth waveguide are straight waveguides.

6. The micro-ring resonator according to claim 1, further comprising a micro heater, wherein the micro heater is coupled between the third waveguide and the fourth waveguide.

7. The micro-ring resonator according to claim 1, wherein an absorption layer is deposited on the second waveguide, and a material of the absorption layer is one of germanium, silicon, or tin, or a combination thereof, or a III-V compound material.

8. The micro-ring resonator according to claim 1, wherein sectional structures of the first waveguide, the second waveguide, the third waveguide, and the fourth waveguide are strip-shaped or ridge-shaped.

9. A micro-ring resonator, comprising:
a first straight waveguide;
a second waveguide and a third waveguide, wherein the second waveguide and the third waveguide form an arc waveguide, and the arc waveguide is coupled to the first waveguide; and
a polarization splitter, wherein the polarization splitter and the arc waveguide form a closed ring.

10. The micro-ring resonator according to claim 9, wherein the micro-ring resonator satisfies the following formula:

$$\mathit{Neff}(TE) \times L(\text{perimeter of the closed ring}) + \mathit{Neff}(TM) \times L(\text{perimeter of the closed ring}) = m \times \lambda(TE) = m \times \lambda(TM);$$

wherein Neff is used to indicate an effective refractive index, Neff (TE) is used to indicate an effective refractive index of transverse electric TE mode light, L is used to indicate a length of a waveguide, L (perimeter of the closed ring) is used to indicate the perimeter of the closed ring formed by the second waveguide, the third waveguide, and the polarization splitter, m is used to indicate a resonance level, $\lambda$ is used to indicate a wavelength, and $\lambda$(TE) is used to indicate a wavelength of the transverse electric TE mode light.

11. The micro-ring resonator according to claim 9, wherein a quantity of first straight waveguides is one or more.

12. The micro-ring resonator according to claim 9, wherein one or both of the second waveguide and the third waveguide are bending waveguides.

13. The micro-ring resonator according to claim 9, wherein one or both of the second waveguide and the third waveguide are straight waveguides.

14. The micro-ring resonator according to claim 9, wherein an absorption layer is deposited on the second waveguide, and a material of the absorption layer is one of germanium, silicon, or tin, or a combination thereof, or a III-V compound material.

15. The micro-ring resonator according to claim 9, wherein sectional structures of the first waveguide, the second waveguide, and the third waveguide are strip-shaped or ridge-shaped.

* * * * *